United States Patent
Flanigan et al.

(10) Patent No.: US 7,266,622 B2
(45) Date of Patent: Sep. 4, 2007

(54) METHOD, COMPUTER PROGRAM PRODUCT, AND SYSTEM FOR AUTOMATIC APPLICATION BUFFERING

(75) Inventors: John Kevin Flanigan, San Jose, CA (US); Haley Hoi Lee Fung, Milpitas, CA (US); Judith Eleanor Hill, San Jose, CA (US); Gerald Dean Hughes, Morgan Hill, CA (US); Steve T. Kuo, San Jose, CA (US); Robert Lai, San Jose, CA (US); Andrew Daniel Tollerud, San Jose, CA (US); Jack Chiu-Chiu Yuan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 872 days.

(21) Appl. No.: 10/106,094

(22) Filed: Mar. 25, 2002

(65) Prior Publication Data

US 2003/0182353 A1  Sep. 25, 2003

(51) Int. Cl.
*G06F 3/00* (2006.01)
*G06F 17/30* (2006.01)
*G06F 12/00* (2006.01)

(52) U.S. Cl. .................. 710/56; 707/1; 710/1; 710/52; 711/100; 711/147; 719/311; 719/312

(58) Field of Classification Search ............ 710/52–56; 711/170–173; 709/220–222; 713/1; 718/104
See application file for complete search history.

(56) References Cited

U.S. PATENT DOCUMENTS 4,949,278 A * 8/1990 Davies et al. ................ 706/10

(Continued)

FOREIGN PATENT DOCUMENTS

JP   11161538 A   6/1999

OTHER PUBLICATIONS

Dreas Nielsen, Forth-83 Dynamic memory allocation, Sep.-Oct. 1990, vol. XII, No. 3.*

(Continued)

*Primary Examiner*—Donald Sparks
*Assistant Examiner*—Richard B. Franklin, Jr.
(74) *Attorney, Agent, or Firm*—Kunzler & McKenzie

(57) ABSTRACT

A buffer accessible by an application executing under an application server in a first address space is managed by a database adapter executing in a second address space. A data request from the application executing in said first address space, comprising a buffer locator in the empty state, is received by the database adapter executing in the second address space. A buffer is allocated in the first address space and the address of this buffer is stored in the buffer locator. Data associated with the data request, received from a database subsystem, is copied to the buffer. Control is then transferred back to the application whereby the application utilizes the buffer locator to access the buffer and process the data contained therein. A database adapter automatically managing application buffers across address spaces in accordance with the present invention may be referred to as an "auto-buffer database adapter".

25 Claims, 6 Drawing Sheets

U.S. PATENT DOCUMENTS

| | | | | |
|---|---|---|---|---|
| 5,870,551 | A | 2/1999 | Ozden et al. | 395/200.49 |
| 6,014,695 | A | 1/2000 | Yamashita et al. | 709/219 |
| 6,049,808 | A | 4/2000 | Talluri et al. | 707/201 |
| 6,131,126 | A | 10/2000 | Kougiouris et al. | 709/304 |
| 6,308,238 | B1 | 10/2001 | Smith et al. | 710/129 |
| 6,430,607 | B1 * | 8/2002 | Kavner | 709/217 |
| 2002/0073218 | A1 * | 6/2002 | Aspromonte et al. | 709/231 |

OTHER PUBLICATIONS

Steve Summit; 10.4 Null Pointers; 1995, 1996; http://c-faq.com/~scs/cclass/notes/sx10d.html; pp. 1-2.*

H. M. Deitel and P. J. Deitel; How To Program C++; 2001; Prentice Hall; third Edition; pp. 310-314.*

"File System Request Reflection within the OS/2 DFS Client", IBM Technical Disclosure Bulletin, vol. 38, No. 05, May 1995, pp. 609-610.

Cardone et al. "Guaranteed Delivery of Event Notifications Across Wide Area Networks", Research Disclosure, v41, n411, Jul. 1998, article 411129.

Hrustich, C.; "COBRA For Real-Time, High Performance and Embedded Systems" In *Fourth IEEE International Symposium on Object-Oriented Real-Time Distributed Computing*, Magdenburg, Germany, May 2001, pp. 345-349.

Ryu et al.; "A Dynamic Buffer Management Technique for Minimizing the Necessary Buffer Space in a Continuous Media Server", In *Proceedings of the International Conference on Multimedia Computing and Systems*, Hiroshima, Japan, Jun. 1996, pp. 181-185.

Duato et al.; "SNMP for non TCP/IP sub-networks; an implementation", In *Proceedings of the IFIP TC6/WG6.6 Second International Symposium*, Washington, DC, Apr. 1991, pp. 201-212.

Anderson et al.; "A Case for Buffer Servers", Department of Computer Science, Duke University Durham, NC 27708, IEEE Online Library.

* cited by examiner

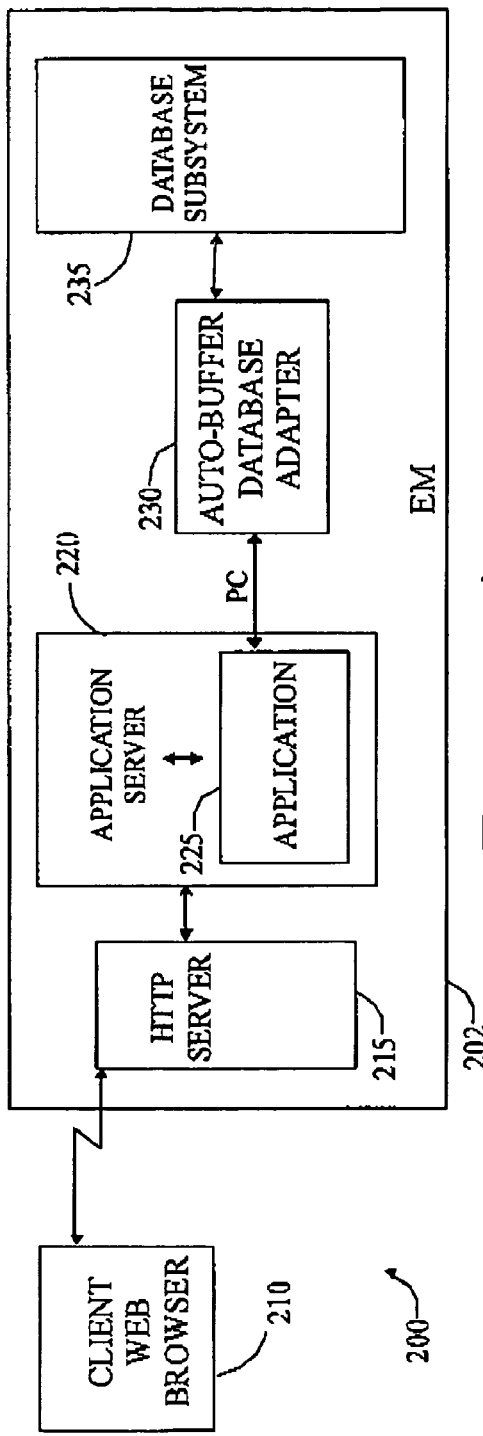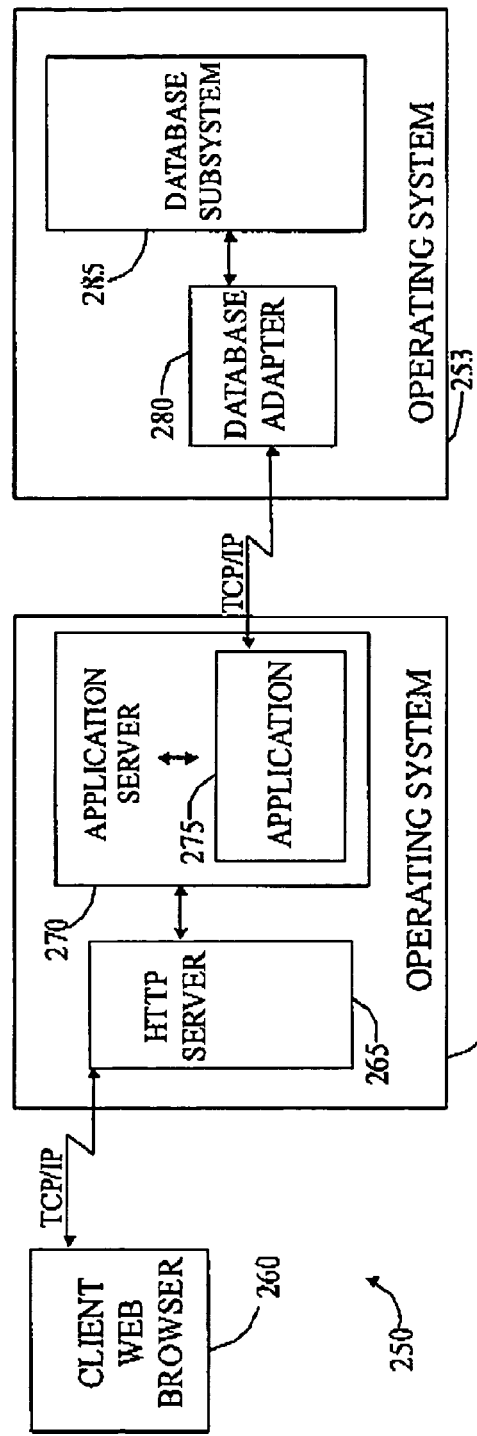

METHOD, COMPUTER PROGRAM PRODUCT, AND SYSTEM FOR AUTOMATIC APPLICATION BUFFERING

FIELD OF INVENTION

The present invention relates generally to the management of buffers. More specifically, the present invention relates to a method, program product and apparatus for the automatic management of application buffers by a database adapter.

BACKGROUND

In the past, leading-edge commercial applications with high performance and reliability requirements were typically run on legacy systems, such as Information Management System (IMS). (IMS is a trademark of International Business Machines Corporation in the United States, other countries, or both.). The near universal acceptance of Web Technologies increases the demands for communication-based applications; however, even in today's distributed computing environments with Web based applications, it is very common for the data associated with WEB based applications to be legacy data (i.e. data that is managed by legacy systems, such as IMS). Therefore, many enterprises are faced with the challenge of making core business applications currently running on legacy systems available to the Internet.

IMS is a hierarchical database management system (HDBMS) developed by International Business Machines Corporation with wide spread usage in many large enterprises where high transaction volume, reliability, availability and scalability are of the utmost importance. IMS provides software and interfaces for running the businesses of many of the world's largest corporations. However, companies incorporating IMS databases into their business models typically make significant investments in IMS application programs in order to have IMS perform meaningful data processing particularly tailored to the needs of their respective enterprises. IMS application programs are typically coded in COBOL, PL/I, C, PASCAL, JAVA or assembly language.

In one example, the typical components of a Web based application may comprise an application program to perform particular business logic, a client system including a web browser for entering data and displaying results, a Web server to provide communication and security layers around the customer application, a database adapter to facilitate application communications with a database subsystem for the processing of data requests. A user interfaces with a client system to view and/or process data in accordance with the user's needs and the capabilities provided by the various enterprise applications. This results in the client system's web browser communicating with the Web server component using the HyperText Transfer Protocol (HTTP) over an Internet connection using Transmission Control Protocol/Internet Protocol (TCP/IP). The Web server identifies the appropriate application and schedules this application for execution. Upon receiving control, the application invokes the database adapter to communicate with the database subsystem to handle data requests.

In this environment the application, with respect to the database adapter, is a client and makes data requests to the database adapter for processing by the database subsystem. The application provides buffers to receive the requested data. However, prior to receiving the requested data, the application may not know the size of the requested data to be returned by the database subsystem and accordingly the previously allocated buffer is of an estimated size. If the buffer size is larger than required, then valuable system resources are wasted in that excessive storage is reserved for the application and unavailable to other processes within the system.

However, if the buffer size is insufficient to hold the incoming data, a significant amount of extra processing is required with a corresponding impact to system performance. This extra processing may entail receiving only a portion of the requested data, saving this portion from the application buffer, and then initiating an additional request to the database adapter for the remainder of the requested data. If the buffer is insufficient to receive the entire remaining portion, then the process described supra is repeated until, eventually, the entire data request is satisfied. Alternatively, the buffer could be discarded and a larger buffer of sufficient size allocated, followed by repeating the original request to the database adapter. Either way, significant degradation of system performance and response time delay may result from this extended processing overhead.

In addition to these problems, the programmers developing each application to invoke the database adapter must deal with the complexity of managing buffers in an ambiguous environment entailing unpredictable buffer size requirements. Additional time and effort is required of these programmers to design algorithms and write program instructions that attempt to deal with this complexity and ambiguity. Even after expending much design effort, the ambiguity precludes achieving optimal results.

Accordingly, there is a great need for an enhanced buffer management facility to simplify application development and enhance overall system performance and response time when Web enabling access to legacy data.

SUMMARY OF THE INVENTION

To overcome these limitations in the prior art briefly described above, the present invention provides a method, program product and apparatus for the automatic management of application buffers by a database adapter. A buffer accessible by an application executing under an application server in a first address space is managed by a database adapter executing in a second address space. A data request from the application executing in the first address space, comprising a buffer locator in the empty state, is received by the database adapter executing in the second address space. A buffer is allocated in the first address space and the address of this buffer is stored in the buffer locator. Data associated with the data request, received from a database subsystem, is copied to the buffer. Control is then transferred back to the application whereby the application utilizes the buffer locator to access the buffer and process the data contained therein. A database adapter automatically managing application buffers across address spaces in accordance with the present invention may be referred to as an "auto-buffer database adapter"

In another embodiment of the present invention, the above-described automatic management of application buffers may be provided as a computer system. The present invention may also be tangibly embodied in and/or readable from a computer-readable medium containing program code (or alternatively, computer instructions.) Program code, when read and executed by a computer system, causes the computer system to perform the above-described method.

A novel method for accessing data in a database subsystem by an application executing in a first address space is also disclosed. A buffer locator is established and the buffer locator is initialized to an empty state. Data is requested from an auto-buffer database adapter executing in a second address space. Control is received back from the auto-buffer database adapter and the buffer is accessed utilizing the buffer locator wherein all of the requested data resides in the buffer.

In this manner, an application running in a first address space can request data from a database adapter running in a second address space without having to design and code a buffer management routine for obtaining buffers to hold the requested data. This is particularly advantageous for those applications making data requests where the length of the requested data is unknown. Accordingly, applications making data requests to database adapters may now be designed and coded with more efficient utilization of system resources with less programming effort and reduced costs.

Various advantages and features of novelty, which characterize the present invention, are pointed out with particularity in the claims annexed hereto and form a part hereof. However, for a better understanding of the invention and its advantages, reference should be made to the accompanying descriptive matter, together with the corresponding drawings which form a further part hereof, in which there is described and illustrated specific examples in accordance with the present invention.

BRIEF DESCRIPTION OF THE DRAWINGS

The present invention is described in conjunction with the appended drawings, where like reference numbers denote the same element throughout the set of drawings:

FIG. 2A shows a block diagram representing an exemplary Web enabled application comprising an application server and database adapter residing on a single operating system;

FIG. 2B shows a block diagram representing an exemplary Web enabled application comprising an application server and database adapter spanning two operating systems;

DETAILED DESCRIPTION

The present invention overcomes the problems associated with the prior art by teaching a system, computer program product, and method for the automatic management of application buffers by a database adapter. In the following detailed description, numerous specific details are set forth in order to provide a thorough understanding of the present invention. Those skilled in the art will recognize, however, that the teaching contained herein may be applied to other embodiments and that the present invention may be practiced apart from these specific details. Accordingly, the present invention should not be limited to the embodiments shown but is to be accorded the widest scope consistent with the principles and features described herein. The following description is presented to enable one of ordinary skill in the art to make and use the present invention and is provided in the context of a patent application and its requirements.

Figure 1:
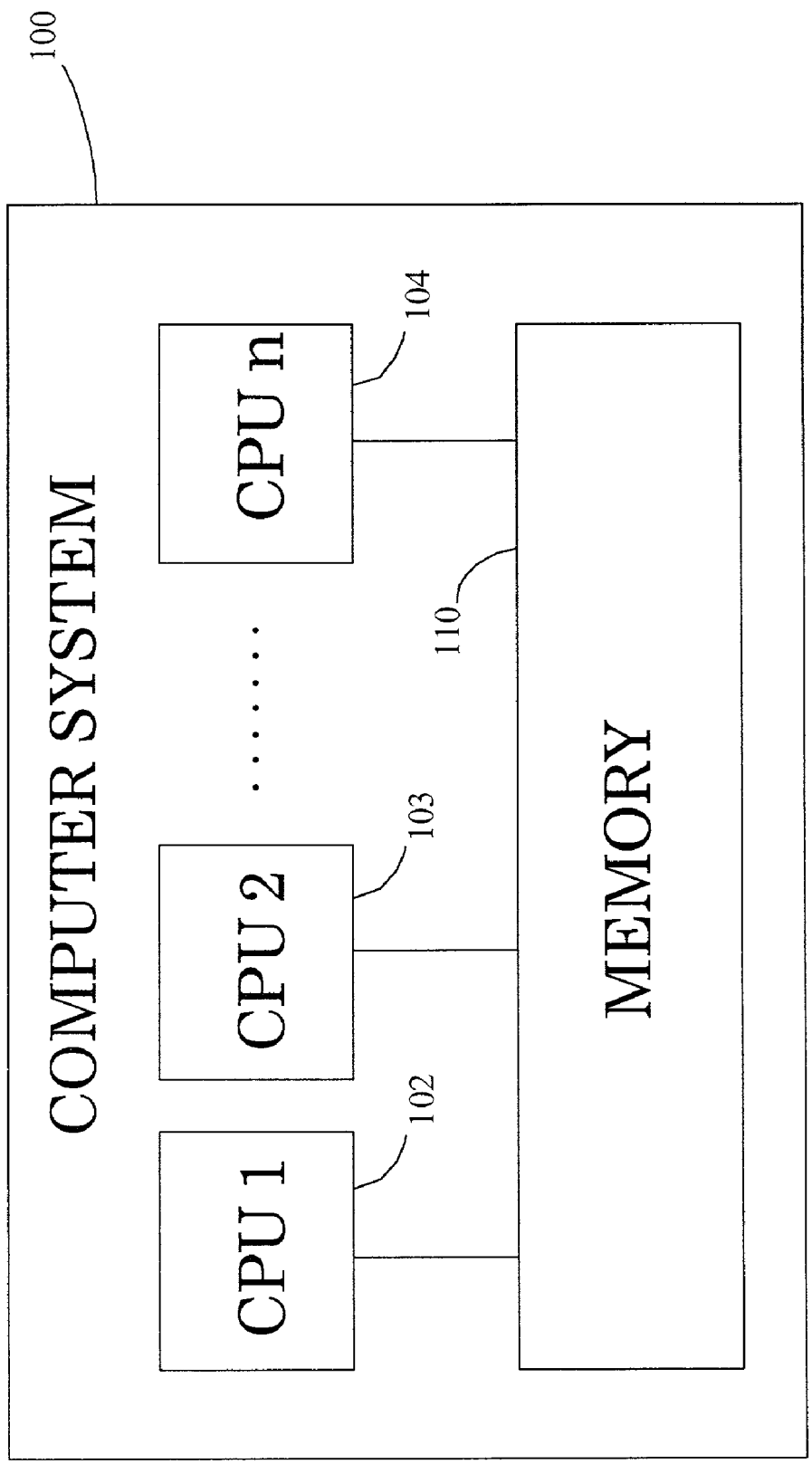
FIG. 1 is a block diagram of a typical computer system wherein the present invention may be practiced.

FIG. 1 is a block diagram of a computer system 100, such as the S/390 mainframe computer system. (S/390 is a registered trademark of International Business Machines Corporation in the United States, other countries, or both.) The computer system 100 comprises one or more central processing units (CPUs) 102, 103, and 104. The CPUs 102-104 suitably operate together in concert with memory 110 in order to execute a variety of tasks. In accordance with techniques known in the art, numerous other components may be utilized with computer system 100, such as input/output devices comprising direct access storage devices (DASDs), printers, tapes, etc. (not shown). Although the present invention is described in a particular hardware environment, those of ordinary skill in the art will recognize and appreciate that this is meant to be illustrative and not restrictive of the present invention. Accordingly, other alternative hardware environments may be used without departing from the scope of the present invention.

Referring now to FIG. 2B, block diagram 250 illustrates an exemplary prior art Web enabled application comprising client system 260, operating system 252 and operating system 253. Client system 260 communicates with HTTP Server 265 utilizing the TCP/IP communication protocol. Http Server 265 receives control and determines that further processing is required by application server 270. Application server 270 provides various common services for applications serviced by application server 270, such as security, network processing and application initialization and termination. Application 275 in instantiated by application server 270 and performs business logic in accordance with the request and the particular functions to be performed. Application 275 may require data to be processed and accordingly may make data requests to database adapter 280 utilizing TCP/IP communication protocol. Database adapter 280 establishes a communication link with application 275 and transforms various data requests into the native interface of database subsystem 285 and then invokes database subsystem 285 to perform the required data processing operations. In exemplary Web enabled application 250, application 275 is required to obtain and manage buffers in accordance with the data processing requirements.

Referring now to block diagram 200, FIG. 2A, in accordance with the present invention a Web enabled application is shown comprising client system 210, and operating system 202. In this embodiment, application 225 communicates with database adapter 230 in a more direct manner since application 225 and database adapter 230 reside within the same operating system 202. In accordance with the present invention, database adapter 230 provides a "local option" enabling application 225 to communicate with database adapter 230 utilizing the MVS cross memory services Program Call (PC) facility and the cross memory services Getmain facility. As more and more enterprises recognize the value and scalability of providing application server 220 on the same powerful mainframe system 202 handling backend legacy data operations, Web enabled application 200 will become a popular platform and will provide an increasingly ubiquitous platform for the significant buffering enhancements described infra.

Those of ordinary skill in the art will recognize that a variety of hardware platforms may be utilized for operating system 202, such as the MVS/ESA operating system, to manage the resources of computer system 100 and provide the framework for running various subsystems and application programs. (MVS/ESA is a trademark of International Business Machines Corporation in the United States, other countries, or both.) Those of ordinary skill in the art will further recognize that the various servers, adapters and database subsystems discussed herein may be provided by a variety of current and future products and vendors and accordingly, the present invention is not limited to particular ones of these but is to be accorded the widest scope consistent with the principles and features described herein. In a representative configuration, application server 220 may be WebSphere (WebSphere is a middleware product developed by IBM corporation), database adapter 230 may be IMS Connect (IMS Connect is a database adapter product developed by IBM Corporation), and database subsystem 235 may be IMS. (WebSphere is a trademark of International Business Machines Corporation in the United States, other countries, or both.)

Those of ordinary skill in the art will recognize that Web enabled application 200 is exemplary in nature and that many other configurations are possible within the scope of the present invention. For example, in an alternative configuration, a custom application 225 may be provided capable of operating entirely outside the scope of application server 220 and, accordingly, application server 220 may or may not be present in this embodiment.

Generally, the novel methods disclosed herein may be tangibly embodied in and/or readable from a computer-readable medium containing the program code (or alternatively, computer instructions), which when read and executed by computer system 100 causes computer system 100 to perform the steps necessary to implement and/or use the present invention. Thus, the present invention may be implemented as a method, an apparatus, or an article of manufacture using standard programming and/or engineering techniques to produce software, firmware, hardware, or any combination thereof The term "article of manufacture" (or alternatively, "computer program product") as used herein is intended to encompass a computer program accessible from any computer-readable device, carrier, or media. Examples of a computer readable device, carrier or media include, but are not limited to, palpable physical media such as a CD ROM, diskette, hard drive and the like.

Figure 3:
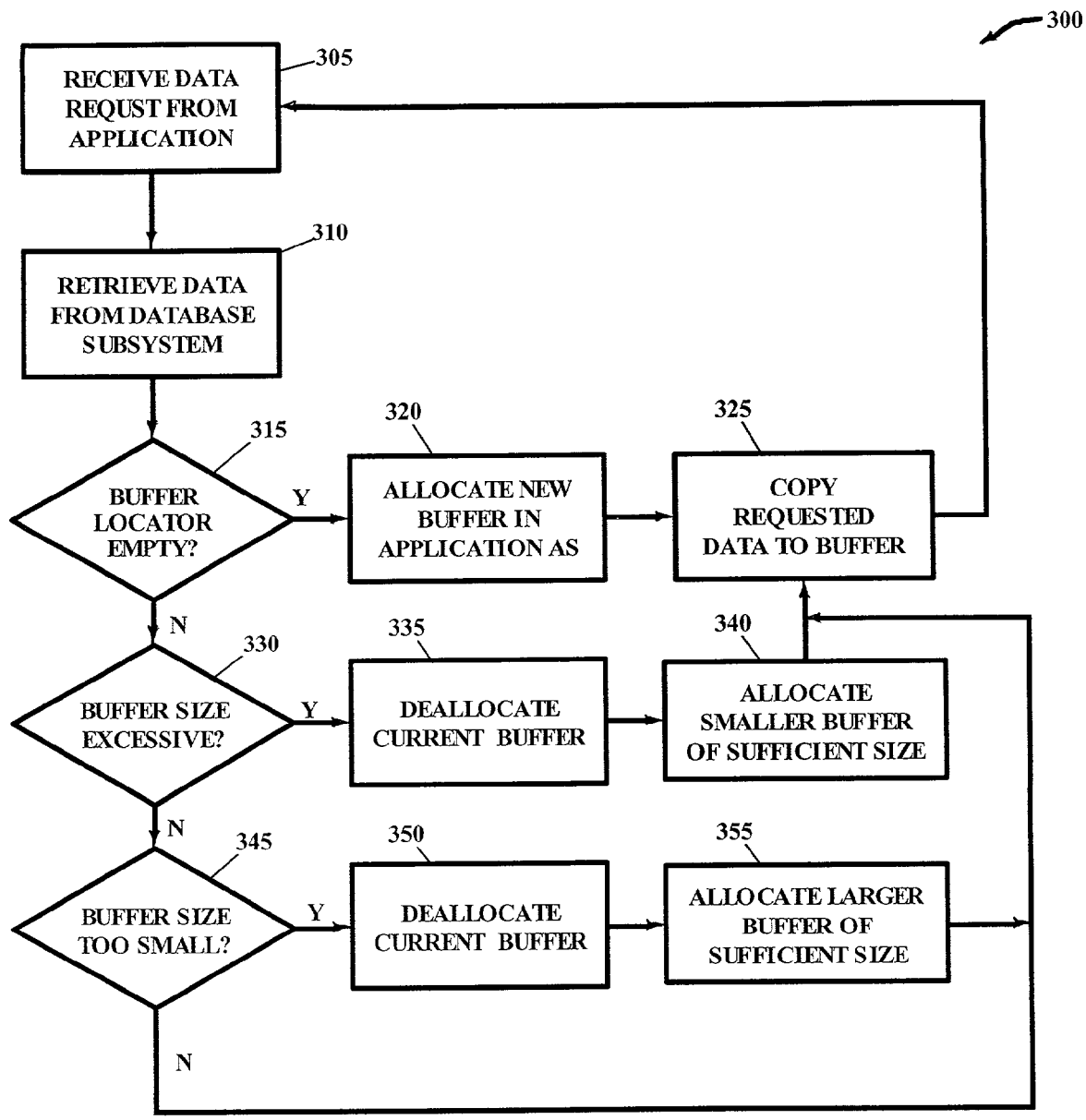
FIG. 3 is a flow diagram summarizing auto-buffer database adapter processing.

Referring now to FIG. 3, in conjunction with block diagram 200 of FIG. 2A, flow diagram 300 illustrates the high level buffer management control flow of auto-buffer database adapter 230 for processing a request for data. In step 305, auto-buffer database adapter 230 receives a data retrieval request from application 225. A data request from application 225 includes a buffer locator comprising a memory location used to hold the address of a valid buffer. In step 310, the data retrieval request is transformed in accordance with interface requirements and database subsystem 235 is invoked to receive the requested data. Then, in step 315, a test is made to determine if the buffer locator passed from application 225 is in the empty state (defined to mean that the buffer locator does not contain the address of a valid buffer). Those of ordinary skill in the art will recognize that a variety of programming techniques may be used to indicate an empty state. For example, a common technique initializes the buffer locator memory location to binary zeros to reflect the empty state. In another embodiment, a separate bit associated with the buffer locator may be defined wherein a "1", for example, indicates that the buffer locator is in the empty state and a "0" indicates that the buffer locator contains the address of a valid buffer.

If the buffer locator is in the empty state, then, in step 320, a new buffer is allocated in the address space associated with application 225 utilizing a cross memory getmain service. Those of ordinary skill in the art will recognize that operating systems may provide for enhanced operating system reliability by supporting a concept whereby a program executing in a first address space is protected from accidental or malicious damage from a program executing in a second address space. An address space is an addressable range of virtual addresses that map to physical addresses that are unique to a particular address space. In this manner, access to programs and data residing in other address spaces is strictly controlled by a component of the operating system known as Cross Memory Services.

The allocation process includes storing the address of the newly allocated buffer in the buffer locator and setting the buffer locator to the non-empty state. The newly allocated buffer is of a sufficient size to hold the requested data and may also be larger than the requested data as discussed in further detail in conjunction with FIG. 4 and FIG. 5 infra. In step 325, the requested data is copied to the newly allocated buffer and control is returned to application 225 where the process repeats for the next data request in step 305. Application 225 utilizes the buffer locator to obtain the buffer address of the buffer containing the requested data.

Returning now to step 315, if the buffer locator is not in the empty state, the processing continues with step 330 where a test is made to determine if the buffer size is excessively large with respect to this data retrieve request. This aspect of the present invention is discussed in greater detail in conjunction with FIGS. 4, 5 and 6 infra. If the current buffer size is excessively large, then, in step 335 the current buffer is deallocated utilizing cross memory freemain services. In step 340, a new buffer is allocated in the same address space associated with application 225 using a cross memory getmain service. The address of the newly allocated buffer is stored in the buffer locator and the buffer locator is set to the non-empty state. The new buffer is smaller than the previous buffer, but it is adequately sized to contain the requested data and may be larger than the requested data, as discussed in further detail in conjunction with FIG. 4 and FIG. 5 infra. Then, in step 325 the requested data is copied to the new buffer and control is returned to application 225 where the process repeats for the next data request in step 305.

Returning now to step 330, if it is determined that the current buffer size is not excessively large, then, in step 345, a test is made to determine if the current buffer size is too small to contain the requested data. If so, then in step 350, the current buffer is deallocated and in step 355 a new buffer is allocated in the same address space as application 225 using a cross memory getmain service. The address of the newly allocated buffer is stored in the buffer locator and the buffer locator is set to the non-empty state. The new buffer is larger than the previous buffer, adequately sized to contain the requested data, and may be larger than the requested data, as discussed in further detail in conjunction with FIG. 4 and FIG. 5 infra. Then, in step 325 the requested data is copied to the new buffer and control is returned to application 225 where the process repeats for the next data request in step 305.

Returning now to step 345, if it is determined that the size of the current buffer is not too small, then, in step 325, the requested data is copied to the current buffer and control is returned to application 225 where the process repeats for the next data request in step 305.

When application 225 has completed all data requests to database adapter 230, application 225 may invoke database adapter 230 with a request to disconnect from database subsystem 235. This disconnect request signals to database adapter 230 that all data requests are now complete and accordingly database adapter 230 deallocates the buffer associated with the disconnect and sets the associated buffer locator to the empty state. Deallocating a buffer comprises returning the storage occupied by the buffer to operating system 202 whereby the storage may be utilized by other processes operating within computer system 100 (this process is not shown).

Alternatively, application server 220 may manage connection and disconnection processing on behalf of application 225. In this embodiment, a request to disconnect by application 225 is intercepted by application server 220. Responsive to this request, application server 220 may choose to retain the buffer associated with the disconnect request for use by a subsequent application operating within the same address space as application 225. Application server 220 may also choose to invoke database adapter 230 with a request to disconnect in accordance with balancing system resources and application requirements. As discussed supra, responsive to this request database adapter 230 deallocates the buffer associated with the disconnect request and sets the associated buffer locator to the empty state (this process is not shown).

While flow diagram 300 illustrates the management of a single buffer per data request, those of ordinary skill in the art will recognize that multiple buffers and multiple buffer locators could also be used with out departing from the scope of the present invention.

Figure 4:
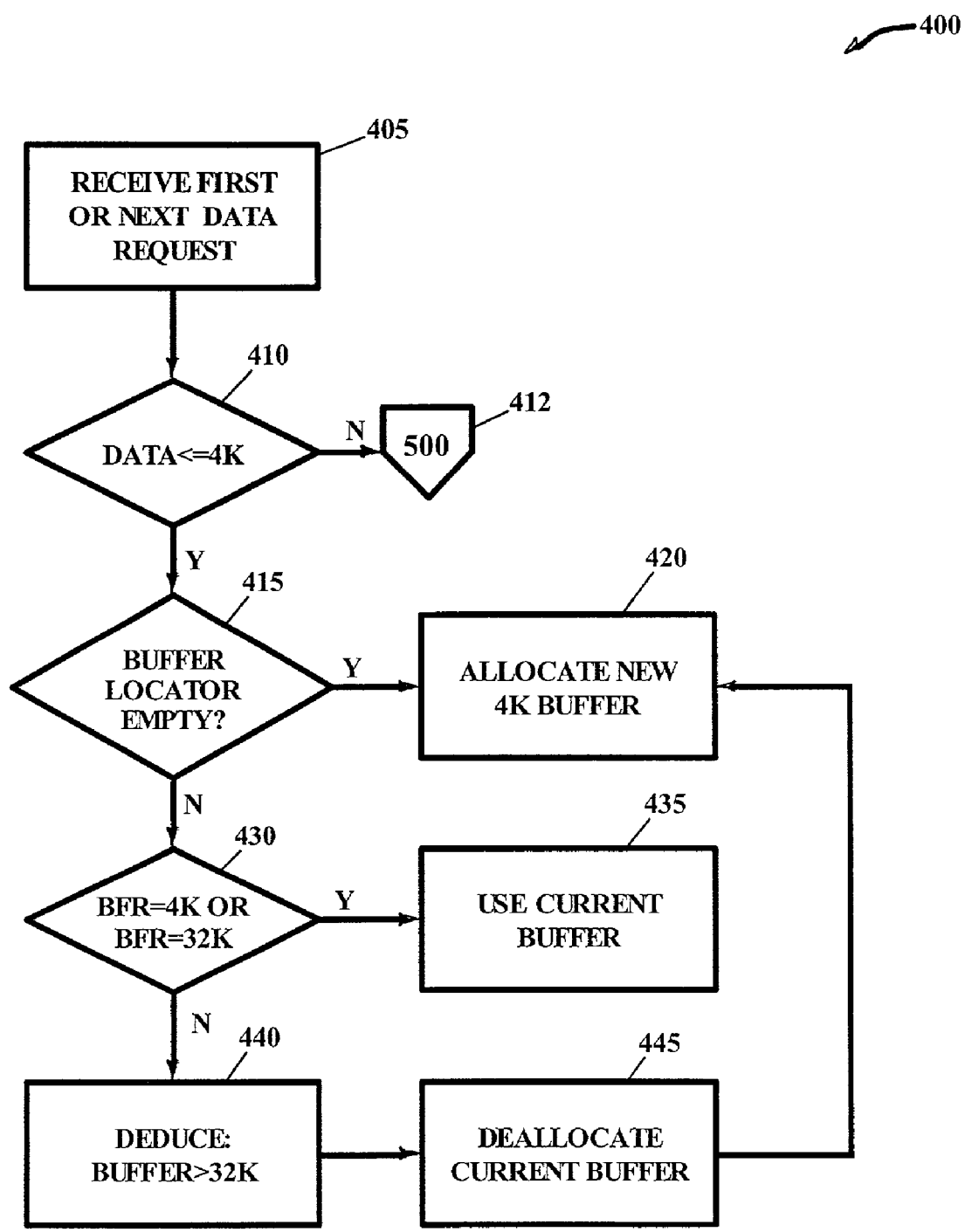
FIG. 4 is a flow diagram summarizing additional processing detail when the data size is less than or equal to 4K.
Figure 5:
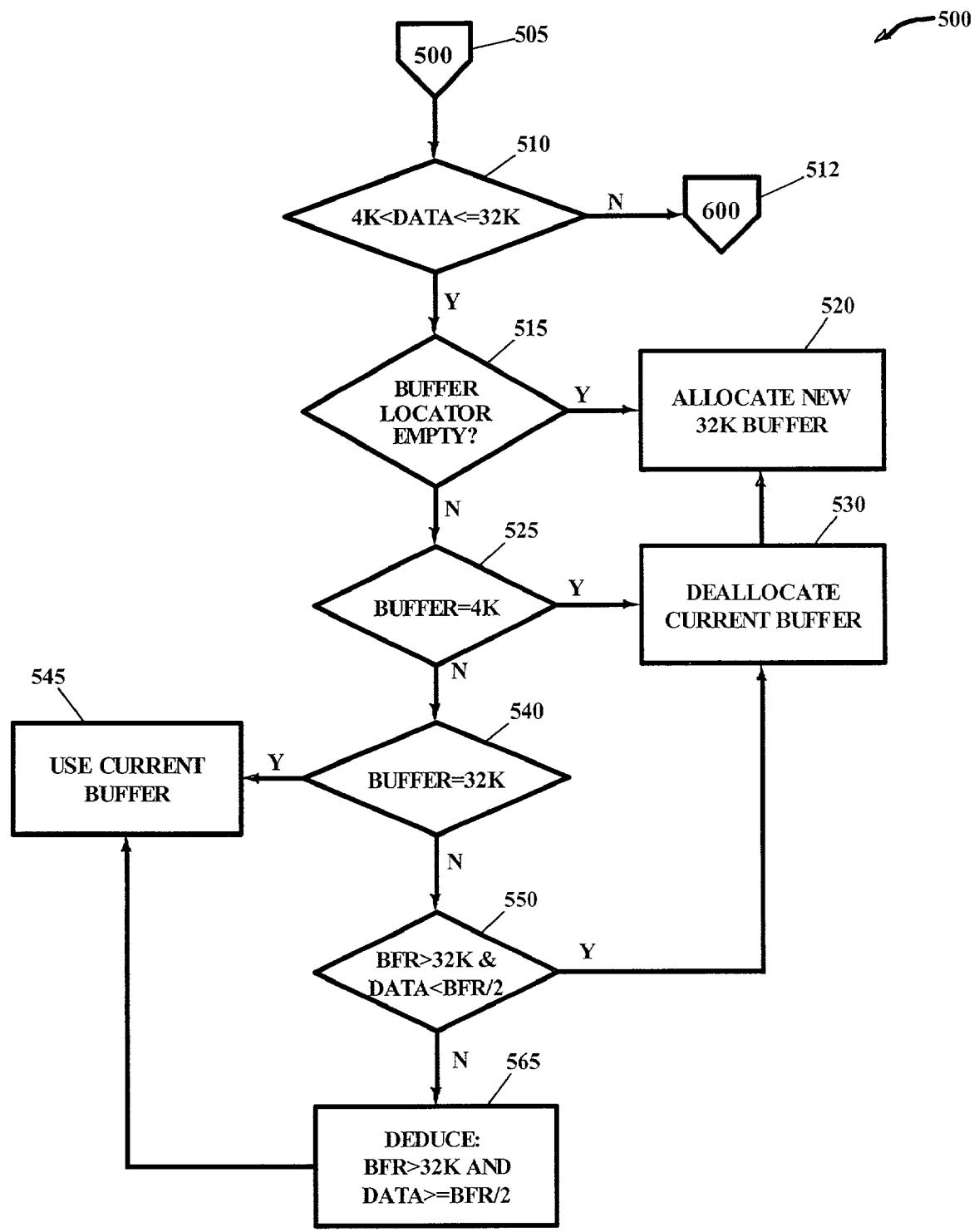
FIG. 5 is a flow diagram summarizing additional processing detail when the data size is greater than 4K but less than or equal to 32K.
Figure 6:
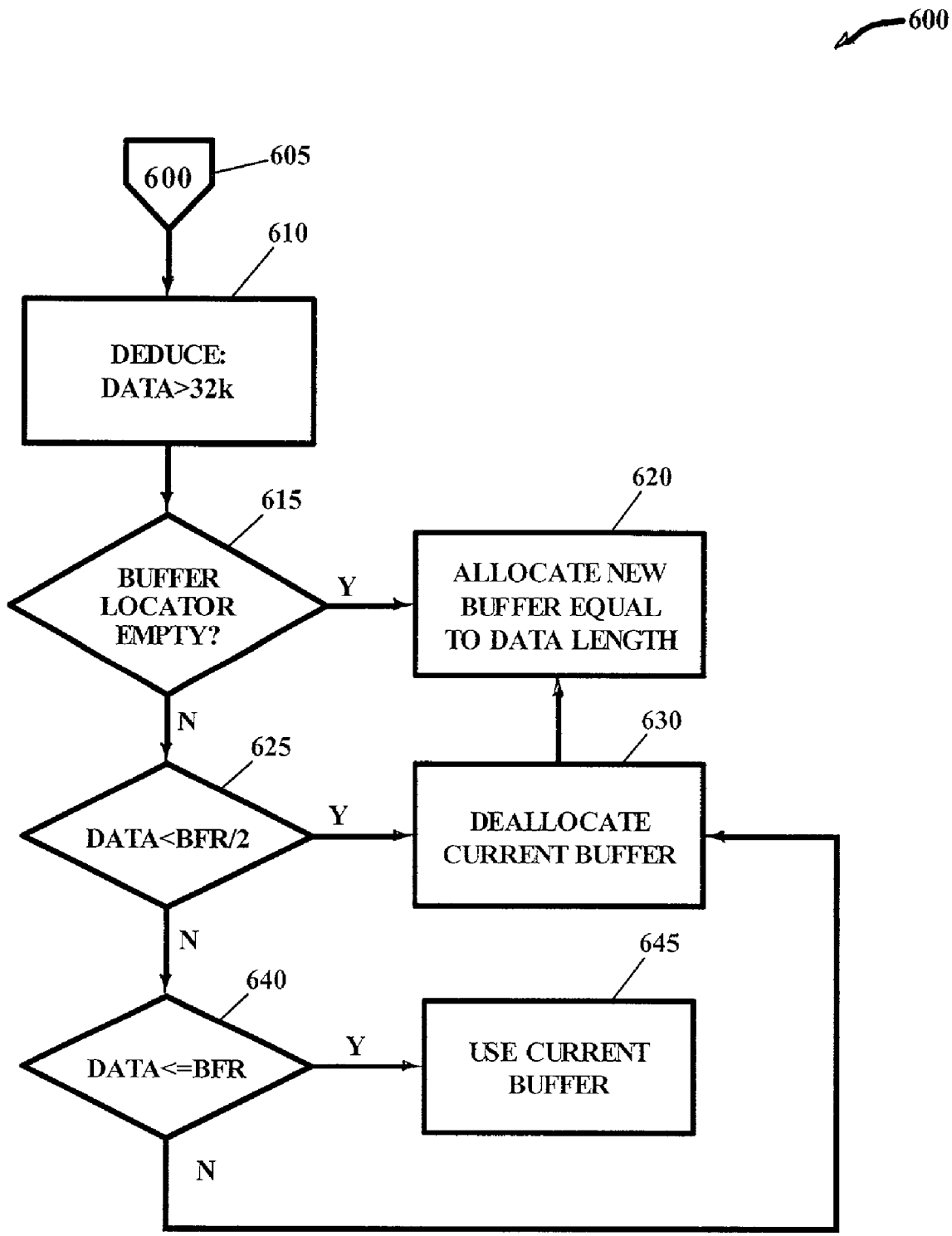
FIG. 6 is a flow diagram summarizing additional processing detail when the data size is greater than 32K.

FIGS. 4, 5 and 6 illustrate additional flow diagrams for auto-buffer database adapter 230 that summarize one embodiment for selecting and adjusting buffer sizes to achieve greater processing efficiency by enhancing the probability for buffer re-use and at the same time conserving system resources. Referring now to FIG. 4, in conjunction with block diagram 200 of FIG. 2A, flow diagram 400 illustrates one aspect of the buffer management control flow of auto-buffer database adapter 230 when the requested data has a length that is less than or equal to 4096 bytes (4K). Those of ordinary skill in the art will recognize that the choice of 4K as a default buffer size is exemplary and that numerous other choices may be made for a default buffer size.

In step 405, auto-buffer database adapter 230 receives a data retrieval request from application 225. As discussed supra in conjunction with flow diagram 300, the requested data is retrieved from database subsystem 235 and, in step 410, a test is made to determine if the length of the requested data is less than or equal to 4K. If the length of the requested data is greater than 4K, then in step 412 control passes to flow diagram 500, FIG. 5. Otherwise, in step 415, a test is made to determine if the buffer locator passed from application 225 is in the empty state. If the buffer locator is in the empty state, then, in step 420, a new buffer is allocated, as discussed supra in conjunction with flow diagram 300, with the buffer size set to the default buffer size of 4K. Otherwise, in step 430, a test is made to determine if the current buffer size is equal to 4K or 32K. If so, in step 435, the current buffer is used for this data request; otherwise, in step 440, it is deduced that the current buffer size is greater than 32K and, continuing with step 445, the current buffer is deallocated. In step 420, a new buffer is allocated, as discussed supra in conjunction with flow diagram 300, with the buffer size set to a default buffer size of 4K.

Referring now to FIG. 5, in conjunction with block diagram 200 of FIG. 2A, flow diagram 500 illustrates another aspect of the buffer management control flow of auto-buffer database adapter 230 when the requested data has a length that is greater than 4K and less than or equal to 32K. Those of ordinary skill in the art will recognize that the choice of 32K as a second default buffer size is exemplary and that numerous other choice may be made for a second default buffer size.

In step 505, auto-buffer database adapter 230 processing receives control from step 412 of flow diagram 400 and then in step 510, a test is made to determine if the length of the requested data is greater than 4K and less than or equal to 32K. If the length of the requested data is not within this range, then in step 512 control passes to flow diagram 600, FIG. 6. Otherwise, in step 515, a test is made to determine if the buffer locator passed from application 225 is in the empty state. If the buffer locator is in the empty state, then, in step 520, a new buffer is allocated, as discussed supra in conjunction with flow diagram 300, with the buffer size set to the second default buffer size of 32K. Otherwise, in step 525, a test is made to determine if the current buffer size is equal to 4K. If so, in step 530, the current buffer is deallocated and in step 520 a new buffer is allocated, as discussed supra in conjunction with flow diagram 300, with the buffer size set to the second default buffer size of 32K. Returning now to step 525, if the current buffer size is not equal to 4K, then in step 540 a test is made to determine if the current buffer size is equal to 32K. If so, in step 545, it is determined that the current buffer will be used for this data request; otherwise, in step 550, a test is made to determine if the current buffer size is greater than 32K and also greater than twice the length of the data being requested. If so, in step 530, the current buffer is deallocated and in step 520 a new buffer is allocated, as discussed supra in conjunction with flow diagram 300, with the buffer size set to the second default buffer size of 32K. Otherwise, in step 565 it is deduced that the current buffer is greater than 32K but less than or equal to twice the length of the data being requested and accordingly, in step 545, a determination is made to use the current buffer.

Referring now to FIG. 6, in conjunction with block diagram 200 of FIG. 2A, flow diagram 600 illustrates another aspect of the buffer management control flow of auto-buffer database adapter 230 when the requested data has a length that is greater than 32K.

In step 605, auto-buffer database adapter 230 processing receives control from step 512 of flow diagram 500 and then in step 610, it is deduced from the previous tests that the length of the requested data is greater than 32K. In step 615, a test is made to determine if the buffer locator passed from application 225 is in the empty state. If the buffer locator is in the empty state, then, in step 620, a new buffer is allocated, as discussed supra in conjunction with flow diagram 300, with the buffer size set to the length of the requested data. Otherwise, in step 625, a test is made to determine if the current buffer is greater than twice the length of the data being requested. If so, in step 630 the current buffer is deallocated and in step 620 a new buffer is allocated, as discussed supra in conjunction with flow diagram 300, with the buffer size set to the length of the requested data. Otherwise a test is made, in step 640, to determine if the length of the requested data is less than or equal to the length of the current buffer. If so, in step 645 it is determined that the current buffer will be used for the requested data. Otherwise, in step 630 the current buffer is deallocated and in step 620 a new buffer is allocated, as discussed supra in conjunction with flow diagram 300, with the buffer size set to the length of the requested data.

Those of ordinary skill in the art will recognize that many other tests could be substituted for step 625 to determine that a buffer is substantially larger than it needs to be and is therefore consuming excessive computer system resources. For example, step 625 could also test to see if the buffer is at least 50% larger than the length of the requested data in determining that the buffer is substantially larger than it needs to be.

Taken in combination flow diagram 300, 400, 500 and 600 in conjunction with supporting diagrams and detailed descriptions provide for enhanced system performance and programmer productivity by automatically managing application buffers in a first address space by an auto-buffer database adapter executing in a second address space. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. § 112, sixth paragraph, unless the element is expressly recited using the phrase "means for" or "step for."

While the preferred embodiment of the present invention has been described in detail, it will be understood that modification and adaptations to the embodiment(s) shown may occur to one of ordinary skill in the art without departing from the scope of the present invention as set forth in the following claims. Thus, the scope of this invention is to be construed according to the appended claims and not just to the specific details disclosed in the exemplary embodiments.

What is claimed:

1. A method for managing a buffer in a mainframe computer, said buffer comprising one or more individual buffers and accessible by an application executing under an application server, the application and the application server executing in a first address space of the mainframe computer and said buffer managed by a database adapter executing in a second address space of the mainframe computer, wherein said buffer is directly addressable by a central processing unit (CPU) of the mainframe computer, said method comprising:
   receiving by said database adapter executing in said second address space of said mainframe computer a first data request from said application executing in said first address space of said mainframe computer-comprising a buffer locator, wherein said buffer locator is in an empty state;
   allocating by said database adapter a first buffer in said first address space;
   storing by said database adapter an address of said first buffer in said buffer locator;
   copying by said database adapter said first data associated with said first data request received from a database subsystem to said first buffer; and
   transferring control to said application whereby said application utilizes said buffer locator to access said first buffer and process said first data contained therein.

2. The method of claim 1 wherein a length of said first data is less than or equal to a first default buffer size and wherein said first buffer has a size equal to said first default buffer size.

3. The method of claim 1 wherein a length of said first data is greater than a first default buffer size and less than or equal to a second default buffer size and wherein said first buffer has a size equal to said second default buffer size.

4. The method of claim 1 wherein a length of said first data is greater than a first default buffer size and greater than a second default buffer size and wherein said first buffer has a size equal to the length of said first data.

5. The method of claim 1 further comprising:
   receiving by said database adapter a disconnect request from said application server;
   deallocating said first buffer wherein the storage occupied by said first buffer in said first address space is returned to an operating system for re-use and wherein said operating system manages the resources of said mainframe computer;
   restoring said buffer locator to said empty state; and
   transferring control to said application.

6. The method of claim 1 further comprising:
   intercepting by said application server a request by said application to disconnect from said database subsystem; and
   retaining said first buffer for re-use by a subsequent application executing under said application server.

7. The method of claim 1 further comprising:
   receiving a second data request comprising said buffer locator from said application wherein said buffer locator contains the address of said first buffer;
   determining that a size of said first buffer is less than a length of second data received from said database subsystem, wherein said second data is associated with said second data request;
   allocating a second buffer wherein said second buffer is equal to or greater than the length of said second data;
   copying said second data received from said database subsystem to said second buffer;
   deallocating said first buffer;
   storing an address of said second buffer in said buffer locator; and
   transferring control to said application whereby said application utilizes said buffer locator to access said second buffer and process said second data contained therein.

8. The method of claim 1 further comprising:
   receiving a second data request comprising said buffer locator from said application wherein said buffer locator contains the address of said first buffer;
   determining that a size of said first buffer is greater than twice a length of second data received from said database subsystem, wherein said second data is associated with said second data request;
   allocating a second buffer wherein said second buffer is smaller than said first buffer;
   copying said second data received from said database subsystem to said second buffer;
   deallocating said first buffer;
   storing an address of said second buffer in said buffer locator; and
   transferring control to said application whereby said application utilizes said buffer locator to access said second buffer and process said second data contained therein.

9. A method for accessing data in a database subsystem by an application executing in a first address space of a mainframe computer, the method comprising:
   establishing a buffer locator;
   initializing said buffer locator to an empty state;

requesting data from an auto-buffer database adapter executing in a second address space of said mainframe computer;

allocating by the auto-buffer database adapter a first buffer in the first address space;

storing by the auto-buffer database adapter an address of the first buffer in the buffer locator;

copying by the auto-buffer database adapter first data to said first buffer, the first data associated with a data request received by the auto-buffer database adapter from an application;

receiving control from said auto-buffer database adapter; and accessing a buffer in said first address space utilizing said buffer locator, wherein said requested data resides in said buffer, wherein said mainframe computer comprises at least one central processing unit (CPU) capable of directly accessing memory in both the first address space and the second address space.

10. A mainframe computer for managing a buffer, said buffer comprising one or more individual buffers and accessible by an application executing under an application server, the application and the application server executing in a first address space of said mainframe computer and said buffer managed by a database adapter executing in a second address space of said mainframe computer, comprising:

a central processing unit (CPU), the first address space directly addressable by the CPU; an application comprising computer program instructions executing in said first address space; a second address space directly adressable by the CPU; and the database adapter comprising computer program instructions executing in the second address space;

first computer program instructions for receiving by said database adapter a first data request from said application, said data request comprising a buffer locator, wherein said buffer locator is in an empty state;

second computer program instructions for allocating a first buffer in said first address space, the second computer program instructions comprised within the computer program instructions of said database adapter;

third computer program instructions for storing an address of said first buffer in said buffer locator, the third computer program instructions comprised within the computer program instructions of said database adapter;

fourth computer program instructions for copying first data associated with said first data request received from a database subsystem to said first buffer, the fourth computer program instructions comprised within the computer program instructions of said database adapter; and fifth computer program instructions for transferring control to said application whereby said application utilizes said buffer locator to access said first buffer and process said first data contained therein, wherein the first, computer program instructions, the second computer program instructions, the third computer program instructions, the fourth computer program instructions, and the fifth computer program instructions are executed by the CPU.

11. The mainframe computer of claim 10 wherein a length of said first data is less than or equal to a first default buffer size and wherein said first buffer has a size equal to said first default buffer size.

12. The mainframe computer of claim 10 wherein a length of said first data is greater than a first default buffer size and less than or equal to a second default buffer size and wherein said first buffer has a size equal to said second default buffer size.

13. The mainframe computer of claim 10 wherein a length of said first data is greater than a first default buffer size and greater than a second default buffer size and wherein said first buffer has a size equal to the length of said first data.

14. The mainframe computer of claim 10 further comprising:

means for receiving by said database adapter a disconnect request from said application server;

means for deallocating said first buffer wherein storage occupied by said first buffer in said first address space is returned to an operating system for re-use and wherein said operating system manages the resources of said mainframe computer;

means for restoring said buffer locator to said empty state; and means for transferring control to said application.

15. The system mainframe computer of claim 10 further comprising:

means for intercepting by said application server a request by said application to disconnect from said database subsystem; and means for retaining said first buffer for re-use by a subsequent application executing under said application server.

16. The system mainframe computer of claim 10 further comprising:

means for receiving a second data request comprising said buffer locator from said application wherein said buffer locator contains the address of said first buffer;

means for determining that a size of said first buffer is less than a length of second data received from said database subsystem, wherein said second data is associated with said second data request;

means for allocating a second buffer wherein said second buffer is equal to or greater than the length of said second data;

means for copying said second data received from said database subsystem to said second buffer;

means for deallocating said first buffer;

means for storing an address of said second buffer in said buffer locator; and means for transferring control to said application whereby said application utilizes said buffer locator to access said second buffer and process said second data contained therein.

17. The mainframe computer of claim 10 further comprising:

means for receiving a second data request comprising said buffer locator from said application wherein said buffer locator contains the address of said first buffer;

means for determining that a size of said first buffer is greater than twice a length of second data received from said database subsystem, wherein said second data is associated with said second data request;

means for allocating a second buffer wherein said second buffer is smaller than said first buffer;

means for copying said second data received from said database subsystem to said second buffer;

means for deallocating said first buffer;

means for storing an address of said second buffer in said buffer locator; and means for transferring control to said application whereby said application utilizes said buffer locator to access said second buffer and process said second data contained therein.

18. A computer readable medium tangibly embodying computer instructions for use in a mainframe computer comprising a central processing unit (CPU), said computer instruction being executable by said mainframe computer for managing a buffer, said buffer comprising one or more individual buffers and accessible by an application executing under an application server, the application and the application server executing in a first address space of said mainframe computer and said buffer managed by a database adapter executing in a second address space of said mainframe computer, the computer instructions comprising:
- receiving by said database adapter executing in said second address space of said mainframe computer a first data request from said application executing in said first address space of said mainframe computer comprising a buffer locator, wherein said buffer locator is in an empty state;
- allocating by the database adapter a first buffer in said first address space;
- storing by the database adapter an address of said first buffer in said buffer locator;
- copying by the database adapter first data associated with said first data request received from a database subsystem to said first buffer; and
- transferring control to said application whereby said application utilizes said buffer locator to access said first buffer and process said first data contained therein,
- wherein said central processing unit (CPU) is configured to directly address memory in the first address space and the second address space.

19. The computer readable medium according to claim 18 wherein a length of said first data is less than or equal to a first default buffer size and wherein said first buffer has a size equal to said first default buffer size.

20. The computer readable medium according to claim 18 wherein a length of said first data is greater than a first default buffer size and less than or equal to a second default buffer size and wherein said first buffer has a size equal to said second default buffer size.

21. The computer readable medium according to claim 18 wherein a length of said first data is greater than a first default buffer size and greater than a second default buffer size and wherein said first buffer has a size equal to the length of said first data.

22. The computer readable medium according to claim 18, said computer instructions further comprising:
- receiving by said database adapter a disconnect request from said application server; deallocating said first buffer wherein storage occupied by said first buffer in said first address space is returned to an operating system for re-use and wherein said operating system manages resources of said mainframe computer;
- restoring said buffer locator to said empty state; and
- transferring control to said application.

23. The computer readable medium according to claim 18, said further comprising:
- intercepting by said application server a request by said application to disconnect from said database subsystem; and
- retaining said first buffer for re-use by a subsequent application executing under said application server.

24. The computer readable medium according to claim 18, said computer instructions further comprising:
- receiving a second data request comprising said buffer locator from said application wherein said buffer locator contains the address of said first buffer;
- determining that a size of said first buffer is less than a length of second data received from said database subsystem, wherein said second data is associated with said second data request;
- allocating a second buffer wherein said second buffer is equal to or greater than the length of said second data;
- copying said second data received from said database subsystem to said second buffer;
- deallocating said first buffer;
- storing an address of said second buffer in said buffer locator; and
- transferring control to said application whereby said application utilizes said buffer locator to access said second buffer and process said second data contained therein.

25. The computer readable medium according to claim 18, said computer instructions further comprising:
- receiving a second data request comprising said buffer locator from said application wherein said buffer locator contains the address of said first buffer;
- determining that a size of said first buffer is greater than twice a length of second data received from said database subsystem, wherein said second data is associated with said second data request;
- allocating a second buffer wherein said second buffer is smaller than said first buffer;
- copying said second data received from said database subsystem to said second buffer;
- deallocating said first buffer;
- storing an address of said second buffer in said buffer locator; and
- transferring control to said application whereby said application utilizes said buffer locator to access said second buffer and process said second data contained therein.

* * * * *